(12) United States Patent
Sato et al.

(10) Patent No.: US 11,703,571 B2
(45) Date of Patent: Jul. 18, 2023

(54) OPTICAL DEVICE

(71) Applicant: PIONEER CORPORATION, Tokyo (JP)

(72) Inventors: Makoto Sato, Kawagoe (JP); Takanori Ochiai, Kawagoe (JP); Takuma Yanagisawa, Kawagoe (JP); Masakazu Ogasawara, Kawagoe (JP); Ryo Izuta, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 498 days.

(21) Appl. No.: 16/637,731

(22) PCT Filed: Aug. 1, 2018

(86) PCT No.: PCT/JP2018/028799
§ 371 (c)(1),
(2) Date: Feb. 7, 2020

(87) PCT Pub. No.: WO2019/031328
PCT Pub. Date: Feb. 14, 2019

(65) Prior Publication Data
US 2020/0182980 A1    Jun. 11, 2020

(30) Foreign Application Priority Data
Aug. 7, 2017 (JP) ................................ 2017-152325

(51) Int. Cl.
*G01S 7/481* (2006.01)
*G01S 17/08* (2006.01)
(Continued)

(52) U.S. Cl.
CPC ............ *G01S 7/4817* (2013.01); *G01S 17/08* (2013.01); *G02B 26/0833* (2013.01); *G02B 26/101* (2013.01)

(58) Field of Classification Search
CPC ...... G01S 7/4817; G01S 17/08; G01S 7/4811; G01S 7/4814; G01S 7/4816;
(Continued)

(56) References Cited

U.S. PATENT DOCUMENTS

| | | | |
|---|---|---|---|
| 2002/0143506 A1 | 10/2002 | D'Aligny et al. | |
| 2004/0013138 A1* | 1/2004 | Asami ................. | H01S 5/141 372/20 |

(Continued)

FOREIGN PATENT DOCUMENTS

| | | | |
|---|---|---|---|
| JP | H03179313 A | 8/1991 | |
| JP | 5289017 A | 11/1993 | |

(Continued)

OTHER PUBLICATIONS

International Search Report and Written Opinion for related PCT App. PCT/JP2018/028799 dated Nov. 6, 2018, 3 pages.

(Continued)

*Primary Examiner* — Jared Walker
(74) *Attorney, Agent, or Firm* — Procopio, Cory, Hargreaves & Savitch LLP

(57) ABSTRACT

Provided is an optical device capable of suppressing variations in the range for scanning light. This optical device comprises: a light source that emits a laser beam; a MEMS mirror that scans the laser beam toward a predetermined range; and a diffraction grating that guides the laser beam to the MEMS mirror by guiding the laser beam in a direction corresponding to the wavelength thereof. The optical device also comprises an MEMS control unit that performs control such that, by employing a change in the optical path of the laser beam caused through the diffraction grating by a change in the wavelength of the laser beam, variations in the scanning range of the laser beam by the MEMS mirror are suppressed.

7 Claims, 8 Drawing Sheets

(51) Int. Cl.
*G02B 26/08* (2006.01)
*G02B 26/10* (2006.01)

(58) Field of Classification Search
CPC ... G01S 7/4972; G01S 17/89; G02B 26/0833; G02B 26/101; G02B 26/10
See application file for complete search history.

(56) References Cited

U.S. PATENT DOCUMENTS

| | | | |
|---|---|---|---|
| 2007/0177241 A1* | 8/2007 | Keh | G02B 26/0833 359/200.7 |
| 2007/0187580 A1* | 8/2007 | Kykta | G02B 27/017 250/227.15 |
| 2011/0090516 A1* | 4/2011 | Yamaguchi | G01B 11/026 356/615 |
| 2012/0154893 A1* | 6/2012 | Hotta | G02F 1/133553 359/278 |
| 2013/0002790 A1* | 1/2013 | Chino | G02B 26/127 347/224 |
| 2013/0050697 A1* | 2/2013 | Colbourne | G01J 3/027 359/615 |
| 2014/0268127 A1 | 9/2014 | Day | |
| 2016/0291137 A1 | 10/2016 | Sakimura et al. | |
| 2016/0313545 A1 | 10/2016 | Kondo et al. | |
| 2016/0363749 A1 | 12/2016 | Yamashita | |
| 2017/0102461 A1* | 4/2017 | Tezuka | G01S 7/4863 |
| 2017/0261612 A1* | 9/2017 | Akiyama | G01S 7/4865 |
| 2017/0351090 A1* | 12/2017 | Sekiya | G02B 26/10 |

FOREIGN PATENT DOCUMENTS

| | | |
|---|---|---|
| JP | 2000214406 A | 8/2000 |
| JP | 2002-257526 A | 9/2002 |
| JP | 2003337217 A | 11/2003 |
| JP | 2004287293 A | 10/2004 |
| JP | 2007085832 A | 4/2007 |
| JP | 2008191099 A | 8/2008 |
| JP | 2009047744 A | 3/2009 |
| JP | 2011112585 A | 6/2011 |
| JP | 2013011657 A | 1/2013 |
| JP | 2014232252 A | 12/2014 |
| JP | 2016206534 A | 12/2016 |
| JP | 2016217971 A | 12/2016 |
| JP | 2017003863 A | 1/2017 |
| JP | 2017-72532 A | 4/2017 |
| WO | 2017104613 A1 | 6/2017 |
| WO | 2017122440 A1 | 7/2017 |

OTHER PUBLICATIONS

Japanese Patent Office, Notice of Reasons for Refusal, JP Application No. 2019-535136, dated Dec. 22, 2021, in 8 pages.
Japanese Patent Office, Decision of Refusal, Application No. JP2019-535136, dated Sep. 6, 2022, in 6 pages.

* cited by examiner

OPTICAL DEVICE

CROSS-REFERENCE TO RELATED APPLICATIONS

This application is a U.S. National Stage entry of PCI Application No: PCT/JP2018/028799 filed Aug. 1, 2018, which claims priority to Japanese Patent Application No. 2017-152325, filed Aug. 7, 2017, the contents of which are incorporated herein, by reference.

TECHNICAL FIELD

The present invention relates to an optical device that receives reflected light obtained by reflecting emitted light from an object.

BACKGROUND ART

Conventionally, an apparatus for measuring a distance to an object on the basis of a round-trip time until the reflected light returns by irradiating the object by light has been put into practical use.

In this type of device, in order to separate reflected light used for distance measurement from ambient light such as sunlight, a bandpass filter that transmits only light having the wavelength of the irradiated light is used to improve S/N ratio (for example, refer to Patent Literature 1).

In addition, in this type of apparatus, there is a problem that a wavelength of a light emitting element that emits light for distance measurement is different from a wavelength assumed due to individual variation.

PRIOR ART DOCUMENT

Patent Literature

Patent Literature 1: JP 2007-85832 A

SUMMARY OF INVENTION

Technical Problem

In the invention described in Patent Literature 1, in order to cope with the temperature variation of the light emitting element, the center wavelength of the light transmitted through the bandpass filter is adjusted so as to follow the wavelength of the light emitted from the light projecting unit estimated from the temperature of the semiconductor laser element that is a light emitting element.

In the invention described in Patent Literature 1, since the band pass filter is used, the wavelength to be passed needs to have a certain width in consideration of the variation of the wavelength of light due to individual variation, and there has been a limit to improving the separation accuracy of ambient light.

Further, when the wavelength of light varies, the optical path may vary, and the scanning range of the emitted light may vary depending on the optical element used in the optical system.

An example of the problem to be solved by the present invention is suppression of variations in the scanning range of light as described above.

Solution to Problem

For solving the problem above, according to a first aspect of the present invention, there is provided an optical device comprising:

an emitting unit that emits emitted light;
a scanning unit that scans the emitted light toward a predetermined range;
an optical member that guides the emitted light to the scanning unit by guiding the emitted light in a direction corresponding to a wavelength; and
a control unit that performs control so as to suppress a variation in the scanning range of the emitted light by the scanning unit due to an optical path change of the emitted light through the optical member caused by a change in the wavelength of the emitted light.

DESCRIPTION OF EMBODIMENTS

Figure 1:
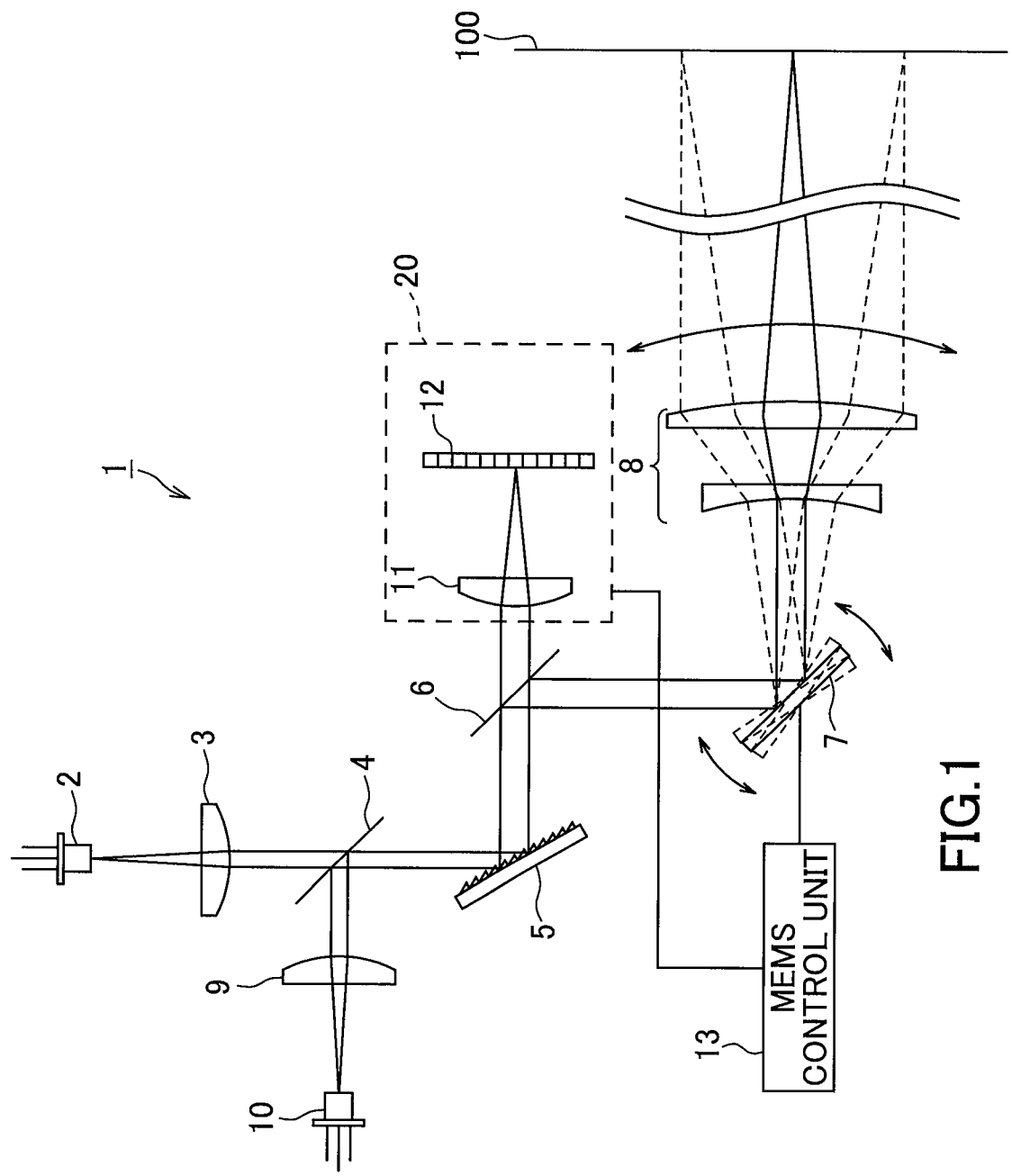
FIG. 1 is a schematic configuration diagram of an optical device according to a first embodiment of the present invention.

Hereinafter, an optical device according to an embodiment of the present invention will be described. An optical device according to an embodiment of the present invention includes: an emission unit that emits emitted light; a scanning unit that scans the emitted light toward a predetermined range, and an optical member that guides the emitted light to the scanning unit by guiding the emitted light in a direction corresponding to the wavelength. Further, a control unit is provided which performs control so as to suppress a variation in the scanning range of the emitted light by the scanning unit due to a change in the optical path of the emitted light through the optical member caused by a change in the wavelength of the emitted light.

By having the optical member, the light is guided in a direction corresponding to the wavelength of the light, so that only light having the same wavelength as the light emitted from the light source can be received, and the influence of ambient light can be suppressed. However, when the optical element is arranged in the optical path at the time of light projection, the direction of light emitted from the optical element changes depending on the wavelength of the light, so that the scanning range of the light varies. Therefore, with the above configuration, even if there is a change in the optical path of the emitted light through the optical member caused by a change in the wavelength of the emitted light, the control unit can suppress the variation in the scanning range of the emitted light.

Further, the scanning unit may be a swinging mirror, and the control unit may perform control so as to suppress a variation in the scanning range of the emitted light by changing an angle due to the swinging of the mirror. In this way, by changing the angle of the mirror, it is possible to suppress a variation in the scanning range of the emitted light due to a change in the optical path of the emitted light.

Further, the control unit may perform control so as to suppress a variation in the scanning range of the emitted light by controlling a timing at which the emitted light is emitted from the emission unit. In this way, by changing the emission timing of the emitted light, it is possible to suppress a variation in the scanning range of the emitted light due to a change in the optical path of the emitted light.

Further, the optical device further includes a light receiving unit that receives the reflected light of the emitted light applied to the scanning unit and reflected by the object, and the optical member guides the reflected light to the light receiving unit. In this way, the optical member can guide the reflected light to the light receiving unit while making the optical paths of the emitted light and the reflected light the same. Therefore, even if there is a difference in the wavelength of the emitted light, the reflected light can be guided to the light receiving unit.

In addition, the optical device may include a temperature detecting unit that detects temperature of the emitting unit, and the control unit may perform control to suppress a variation in the scanning range of the emitted light by the scanning unit based on the temperature of the emitting unit detected by the temperature detecting unit. In this way, it is possible to detect a variation in the optical path due to a variation in the wavelength of the emitted light that changes depending on the temperature of the emission unit, and to suppress a variation in the scanning range of the emitted light.

Further, the optical device may further include a wavelength variation detecting unit that detects a variation in the wavelength of the emitted light, and the control unit may perform control based on the variation in the wavelength of the emitted light detected by the wavelength variation detecting unit so as to suppress the variation in the scanning range of the emitted light by the scanning unit. In this way, it is possible to detect a variation in the optical path due to a variation in the wavelength of the emitted light, and suppress a variation in the scanning range of the emitted light.

It may be a distance measuring device that includes an optical device according to the first aspect of the present invention, and that measures a distance to an object based on time required from emission of the emitted light to reception of the emitted light by a light receiving unit. In this way, in the distance measuring device, it is possible to suppress a variation in the scanning range of the emitted light and improve the accuracy of distance measurement.

Embodiment 1

An optical device according to a first embodiment of the present invention will be described with reference to FIGS. 1 to 5. As shown in FIG. 1, the optical device 1 according to the present embodiment includes a light source 2, a collimating lens 3, a beam splitter 4, a diffraction grating 5, a beam splitter 6, a MEMS mirror 7, a light projecting and receiving lens, 8, a condenser lens 9, a light receiving element 10, a condenser lens 11, a line sensor 12, and a MEMS controller 13.

The light source 2 as the emitting unit is constituted by, for example, a laser diode. The light source 2 emits laser light having a predetermined wavelength in a pulse shape.

The collimator lens 3 converts the laser light emitted from the light source 2 into a parallel light beam. The beam splitter 4 outputs the laser light collimated by the collimator lens 3 to the diffraction grating 5, and reflects the laser light from the object 100 diffracted by the diffraction grating 5 and ambient light such as sunlight (including light reflected by the object 100) toward the condenser lens 9.

The diffraction grating 5 as the optical member diffracts the laser light incident via the beam splitter 4 to the beam splitter 6 at a diffraction angle corresponding to the wavelength component of the laser light. Further, the reflected light of the laser light and the ambient light reflected by the beam splitter 6 are diffracted to the beam splitter 4 at a diffraction angle corresponding to the wavelength component of the reflected light and the ambient light. That is, the diffraction grating 5 guides the laser light (emitted light) emitted from the light source 2 (emitting unit) in a direction of an angle corresponding to the wavelength, and guides the reflected light and the ambient light, which are reflected by the object 100 from the laser light (emitted light), in an angle direction corresponding to the wavelengths of these lights. The diffraction grating 5 is arranged on a common optical path of the optical path of the laser light and the optical path of the reflected light of the laser light and the ambient light. Since the optical path where the reflected light enters the optical member and the optical path where the emitted light is guided by the optical member are the same, the diffraction grating 5 guides the incident light in a direction corresponding to its wavelength, thereby guiding the emitted light to the scanning unit and guiding the reflected light to the light receiving unit.

Further, in this embodiment, a blazed diffraction grating having a sawtooth groove shape is used as the diffraction grating 5. The use of a blazed diffraction grating is desirable because the diffraction efficiency of +1st order light can be theoretically made 100% by the blazed diffraction grating. Further, in this embodiment, a reflection type diffraction grating will be described, but a transmission type diffraction grating may be used.

The beam splitter 6 reflects the laser light emitted from the light source 2 and diffracted by the diffraction grating 5 to the MEMS mirror 7, and transmits a part of the laser light toward the condenser lens 11. Further, the beam splitter 6 reflects the reflected light and the like, as the laser light projected by the MEMS mirror 7 and reflected by the object 100, toward the diffraction grating 5.

The MEMS mirror 7 as the scanning unit scans the laser beam guided to the beam splitter 6 by the diffraction grating 5 (optical member) and reflected by the beam splitter 6 in a horizontal direction and a vertical direction toward a region where the object 100 exists. Further, the MEMS mirror 7 reflects the light reflected by the object 100 via the light projecting and receiving lens 8 to the beam splitter 6. The MEMS mirror 7 is a mirror constituted by MEMS (Micro Electro Mechanical Systems), and is driven (swung) by an actuator (not shown) formed integrally with the mirror. Further, the MEMS mirror 7 may be another beam deflecting units such as a galvanometer mirror or a polygon mirror.

The light projecting and receiving lens 8 irradiates (projects) the laser light reflected by the MEMS mirror 7 to an area where the object 100 exists. Further, the reflected light, which is the laser light reflected by the target object 100, and the ambient light are incident (received) on the light projecting and receiving lens 8.

The condenser lens 9 is provided between the beam splitter 4 and the light receiving element 10, and condenses the reflected light of the laser beam reflected by the beam splitter 4 and the ambient light to the light receiving element 10.

The light receiving element 10 serving as the light receiving unit receives reflected light of the laser light and ambient light condensed by the condenser lens 9. That is, the light receiving element 10 receives the light guided by the diffraction grating 5. The light receiving element 10 is configured by, for example, an avalanche photodiode (APD). The light receiving element 10 outputs a signal corresponding to the intensity of the received light (light receiving intensity).

The condenser lens 11 is provided between the beam splitter 6 and the line sensor 12, and condenses a part of the laser light transmitted through the beam splitter 6 to the line sensor 12.

The line sensor 12 as the wavelength variation detecting unit is a light receiving sensor in which a plurality of light receiving elements are formed in a line along a direction in which light passing through the diffraction grating 5 is diffracted. That is, the light diffracted by the diffraction grating 5 is received by the light receiving element corresponding to the wavelength of the light. Each light receiving element of the line sensor 12 outputs a signal corresponding to the intensity of the received light (light receiving intensity) to the MEMS control unit 13. Further, the line sensor 12 can be constituted by, for example, an APD as a light receiving element. The condensing lens 11 and the line sensor 12 constitute a wavelength monitor 20.

The MEMS control unit 13 detects a change in the wavelength of the laser light emitted from the light source 2 based on a signal indicating the light receiving intensity of each light receiving element detected by the line sensor 12, and controls the actuator of the MEMS mirror 7 to adjust the angle at which the laser light is reflected.

Next, an operation of the optical device 1 having the above-described configuration will be described. First, the laser light emitted from the light source 2 is converted into a parallel light beam by the collimator lens 3 and then enters the diffraction grating 5 via the beam splitter 4.

Figure 2:
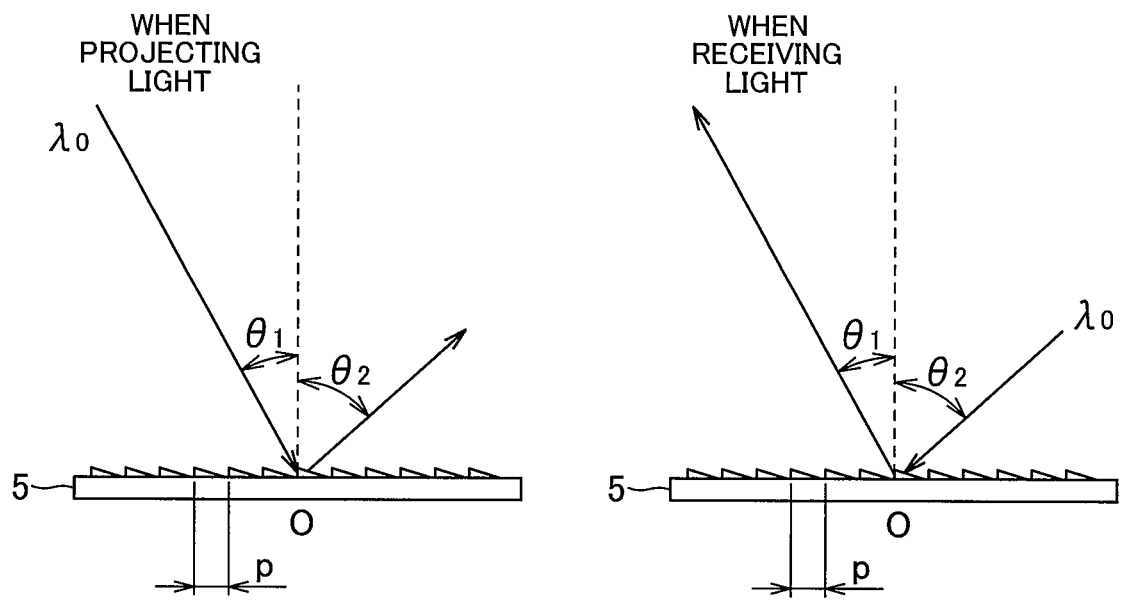
FIG. 2 is an explanatory diagram showing an operation of a diffraction grating shown in FIG. 1.
Figure 3:
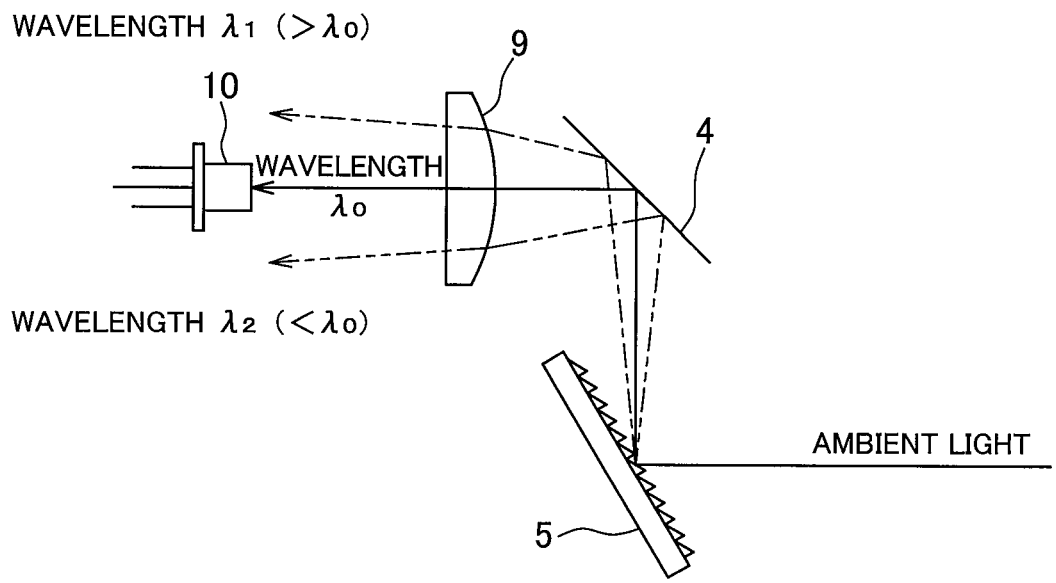
FIG. 3 is an explanatory diagram when ambient light is incident.

Here, it is known that the diffraction grating 5 diffracts light in a predetermined direction uniquely determined by the incident angle and the wavelength of light, and the groove interval (see "when projecting light" in FIG. 2). Assuming that the incident angle of light is $\theta_1$, the wavelength of light is $\lambda_0$, and the groove interval is p, the diffraction angle $\theta_2$ is expressed by the following equation (1).

$$\theta_2 = \operatorname{Sin}^{-1}\left(\sin\theta_1 + \frac{\lambda_0}{p}\right) \quad (1)$$

Laser light emitted in a pulse form from the light source 2 and diffracted by the diffraction grating 5 is reflected by the MEMS mirror 7 via the beam splitter 6 and is irradiated by the light projecting and receiving lens 8 to the outside of the optical device 1. At this time, by changing the angle of the MEMS mirror 7 at each irradiation timing, the position of the beam spot irradiated toward the region where the object 100 exists can be changed with time, and horizontal scanning and vertical scanning are performed.

Next, an operation at the time of incidence (light receiving system) will be described. The laser light reflected (scattered) by the object 100 is received by the light projecting and receiving lens 8, follows an optical path opposite to that at the time of light projection, is reflected by the MEMS mirror 7, and enters the diffraction grating 5 via the beam splitter 6. In this case, since the light is incident at an incident angle of $\theta_2$ in a direction opposite to that at the time of light projection, the diffraction angle is $\theta_1$ (see "when receiving light" of FIG. 2), and the light reaches the beam splitter 4 in such a way as to reverse the optical path at the time of emission. The reflected light of the laser light reflected by the beam splitter 4 is condensed by the condenser lens 9 on the light receiving element 10.

The light incident on the light projecting and receiving lens 8 includes not only reflected light of the emitted laser light, but also any light that illuminates the object 100 such as sunlight or streetlight light, or light that is reflected by the object 100. These ambient lights also enter the diffraction grating 5 via the MEMS mirror 7 through the light projecting and receiving lens 8. Since the diffraction grating 5 diffracts light in different directions depending on the wavelength of the light, the light receiving element 10 receives only the same wavelength component as the light source 2 among the reflected light of the laser light and the light included in the ambient light (the wavelength $\lambda_0$ in FIG. 3), and the light having a wavelength different from the reflected light of the laser light among the ambient light is not received by the light receiving element 10 (the wavelengths $\lambda_1$ and $\lambda_2$ in FIG. 3).

Figure 4:
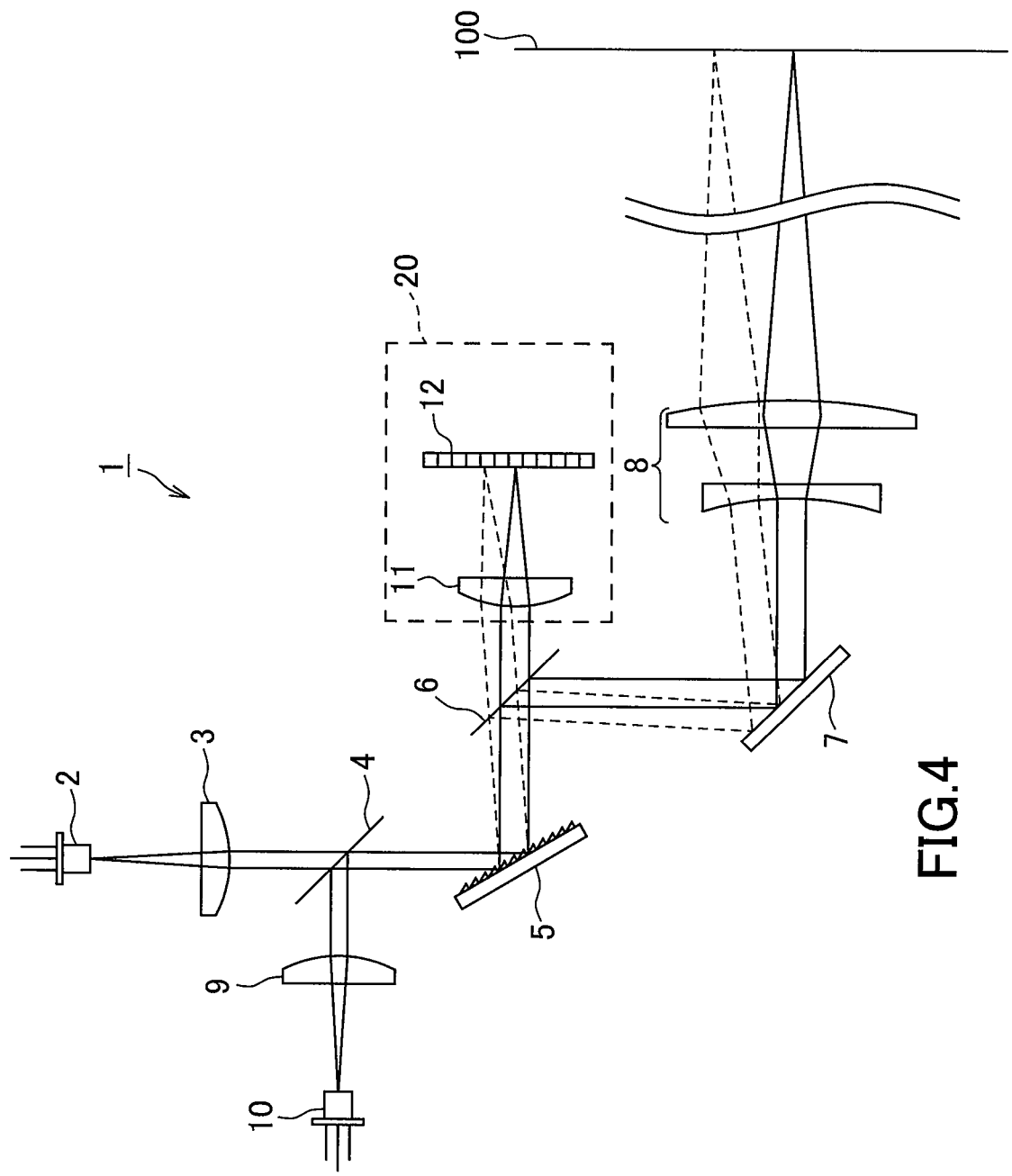
FIG. 4 is an explanatory diagram in a case where there is a wavelength variation in the optical device shown in FIG. 1.

The solid line in FIG. 4 is an example of the optical path of the light source 2 in the optical device 1 before the wavelength variation, and the broken line is an example of the optical path when the wavelength varies. The laser light emitted from the light source 2 and incident on the diffraction grating 5 is diffracted at a small diffraction angle or a large diffraction angle with respect to before the wavelength change, and proceeds as indicated by the broken line. Therefore, as shown in FIG. 4, the scanning range by the laser beam varies by the change in the diffraction angle. The reflected light of the laser light reflected by the object 100 returns to the optical path again along the broken line and enters the diffraction grating 5. Since the incident angle on the diffraction grating 5 at this time is equal to the diffraction angle at the time of emission, the reflected light of the laser beam diffracted by the diffraction grating 5 follows the same optical path as at the time of emission and reaches the beam splitter 4, and is condensed on the light receiving element 10 by the condenser lens 9.

In this way, since the optical path from the diffraction grating 5 to the light receiving element 10 is completely the same before and after the wavelength variation, even if the wavelength of the laser light varies due to the temperature variation of the light source 2 or the like, the single light receiving element 10 can receive light.

That is, the reflected light of the laser light incident on the optical device 1 is incident on the diffraction grating 5 at the same angle as the diffraction angle of the diffraction grating 5 of the laser light (emitted light), and guided to the beam splitter 4 by the diffraction grating 5 at the same angle as the incident angle at which the laser light (emitted light) is incident on the diffraction grating 5.

In the optical device 1 having the configuration illustrated in FIG. 1, as described above, the diffraction angle of the diffraction grating 5 changes as the wavelength of the laser light emitted from the light source 2 changes. Therefore, the irradiating direction of the laser beam via the MEMS mirror changes, and the light projection position on the target object 100 shifts. Therefore, in the present embodiment, a change in the diffraction angle of the diffraction grating 5 is detected by detecting a change in the light receiving element that receives the laser beam in the line sensor 12. The diffraction angle changes depending on the wavelength as described above. Therefore, by detecting a change in the light receiving element of the line sensor 12 that receives the emitted light, it is possible to detect a wavelength change of the laser light. Then, the swing angle of the MEMS mirror 7 is changed according to the detected wavelength change.

Figure 5:
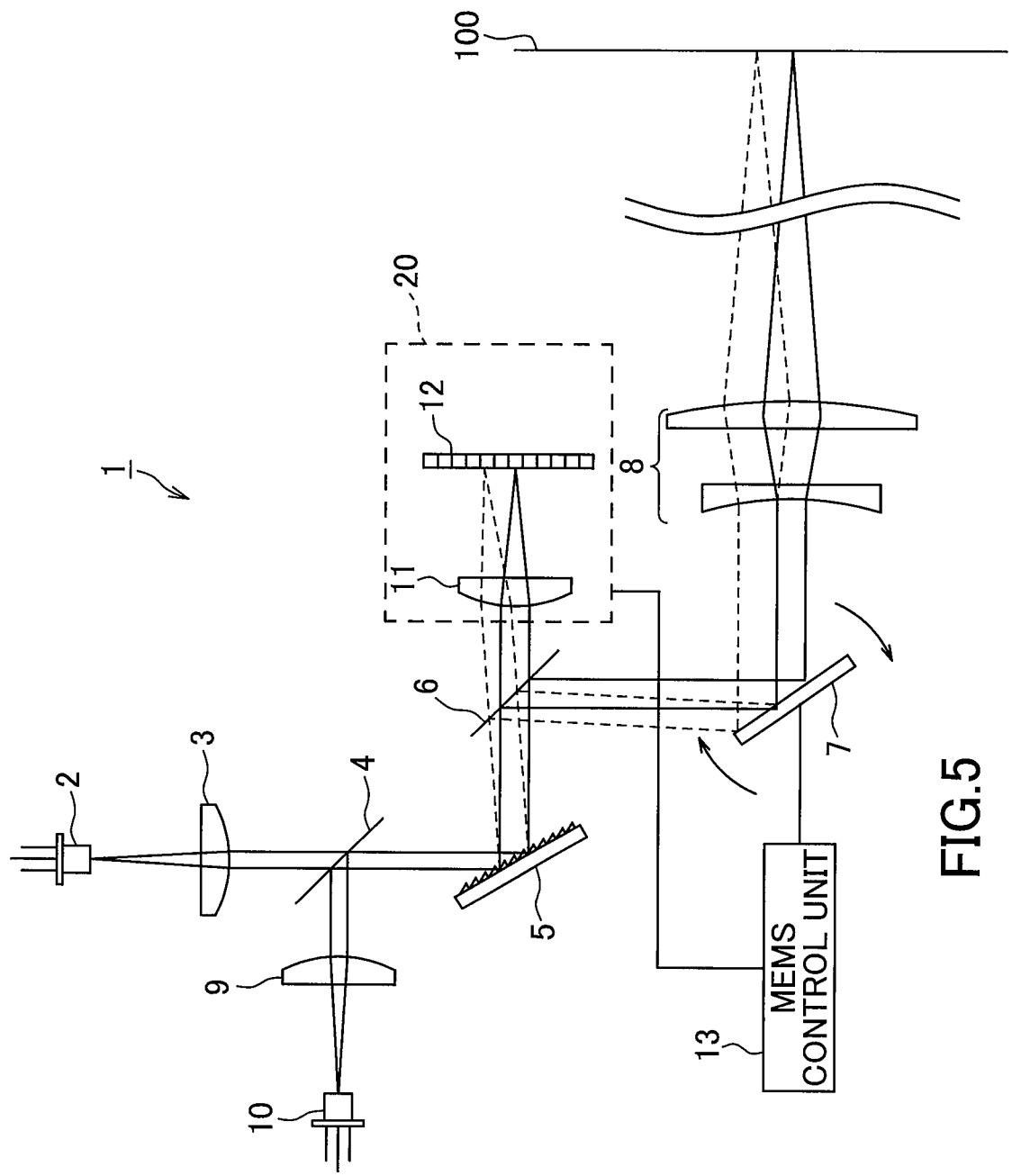
FIG. 5 is an explanatory diagram of a correction operation of an angle of a MEMS mirror in the optical device shown in FIG. 1.

FIG. 5 is an example in the case where the MEMS mirror 7 is controlled by the MEMS control unit 13. In the figure, the solid line is the optical path based on the wavelength before the change, and the broken line is the optical path based on the wavelength after the change. When the wavelength of the laser light changes, the optical path of the laser light diffracted by the diffraction grating 5 changes, and the light projection position on the object 100 changes and shifts. At this time, a part of the laser light transmitted through the beam splitter 6 is received by the light receiving element on the line sensor 12 via the condenser lens 11 which is different from the light receiving element before the wavelength change.

The MEMS control unit 13 determines that the wavelength of the laser light has changed due to a change in the light receiving element having the highest light receiving intensity output from the line sensor 12. Then, in the case of FIG. 5, the MEMS control unit 13 controls the actuator of the MEMS mirror 7 to change the swing angle of the MEMS mirror 7 in accordance with the change in the diffraction angle of the diffraction grating 5 to change the irradiation angle of the laser light to the object 100. In this manner, the control is performed so as to suppress the variation of the scanning range of the laser beam by the MEMS mirror 7.

Here, the relationship between the wavelength and the diffraction angle is determined by the above equation (1). Then, if the size of each light receiving element of the line sensor 12 is known in advance, it is also possible to determine which light receiving element of the line sensor 12 receives the laser beam from the diffraction angle of the diffraction grating 5. Therefore, the angle correction of the MEMS mirror 7 can be controlled by setting the relationship between the wavelength variation and the rotation angle of the MEMS mirror 7 in the MEMS control unit 13 in advance by using a table or a formula.

According to the present embodiment, the optical device 1 includes the light source 2 that emits laser light, the MEMS mirror 7 that scans laser light toward a predetermined range, and the diffraction grating 5 that guides the laser light to the MEMS mirror 7 by guiding the laser light in a direction corresponding to the wavelength. The optical device 13 further includes a MEMS control unit 13 that performs control so as to suppress a variation in the scanning range of the laser light by the MEMS mirror 7 due to a change in the optical path of the laser light via the diffraction grating 5 caused by a change in the wavelength of the laser light. In this way, even if there is a change in the optical path of the laser light through the diffraction grating 5 caused by a change in the wavelength of the laser light, the MEMS control unit 13 can suppress the change in the scanning range of the laser light.

Further, the MEMS control unit 13 controls the MEMS mirror 7 so as to suppress the variation of the scanning range of the laser beam by changing the angle due to the swing. In this way, by changing the angle of the MEMS mirror 7, the variation in the scanning range of the laser light due to a change in the optical path of the laser light can be suppressed.

In addition, the optical device 1 has the light receiving element 10 that receives the reflected light of the laser light emitted from the MEMS mirror 7 on the object 100, and the diffraction grating 5 guides the reflected light of the laser light to the light receiving element 10. In this way, the reflected light of the laser light can be guided to the light receiving element 10 by using the optical member to make the optical path of the laser light and the reflected light of the laser light the same. Therefore, even if there is a difference in the wavelength of the laser light, the reflected light of the laser light can be guided to the light receiving element 10.

In addition, the optical device 1 may include a line sensor 12 that detects a change in the wavelength of the laser light, and the MEMS control unit 13 may perform control based on a change in the wavelength of the laser light detected by the line sensor 12 so as to suppress the variation in the scanning range of the laser light by the MEMS mirror 7. In this way, it is possible to detect a change in the optical path due to a change in the wavelength of the laser light and suppress the variation in the scanning range of the laser light.

In addition, the optical device 1 can be used for measuring a distance to the object. That is, the time from when the light source 2 emits the laser light to when it is received by the light receiving element 10 as the reflected light reflected by the object 100 is measured by the CPU or the like of the distance measuring device equipped with the optical device 1. Thus, the distance from the optical device 1 to the object 100 can be measured.

Embodiment 2

Next, an optical device according to a second embodiment of the present invention will be described with reference to FIGS. 6 and 7. Note that the same components as those in the above-described first embodiment are denoted by the same reference signs, and the descriptions thereof will be omitted.

Figure 6:
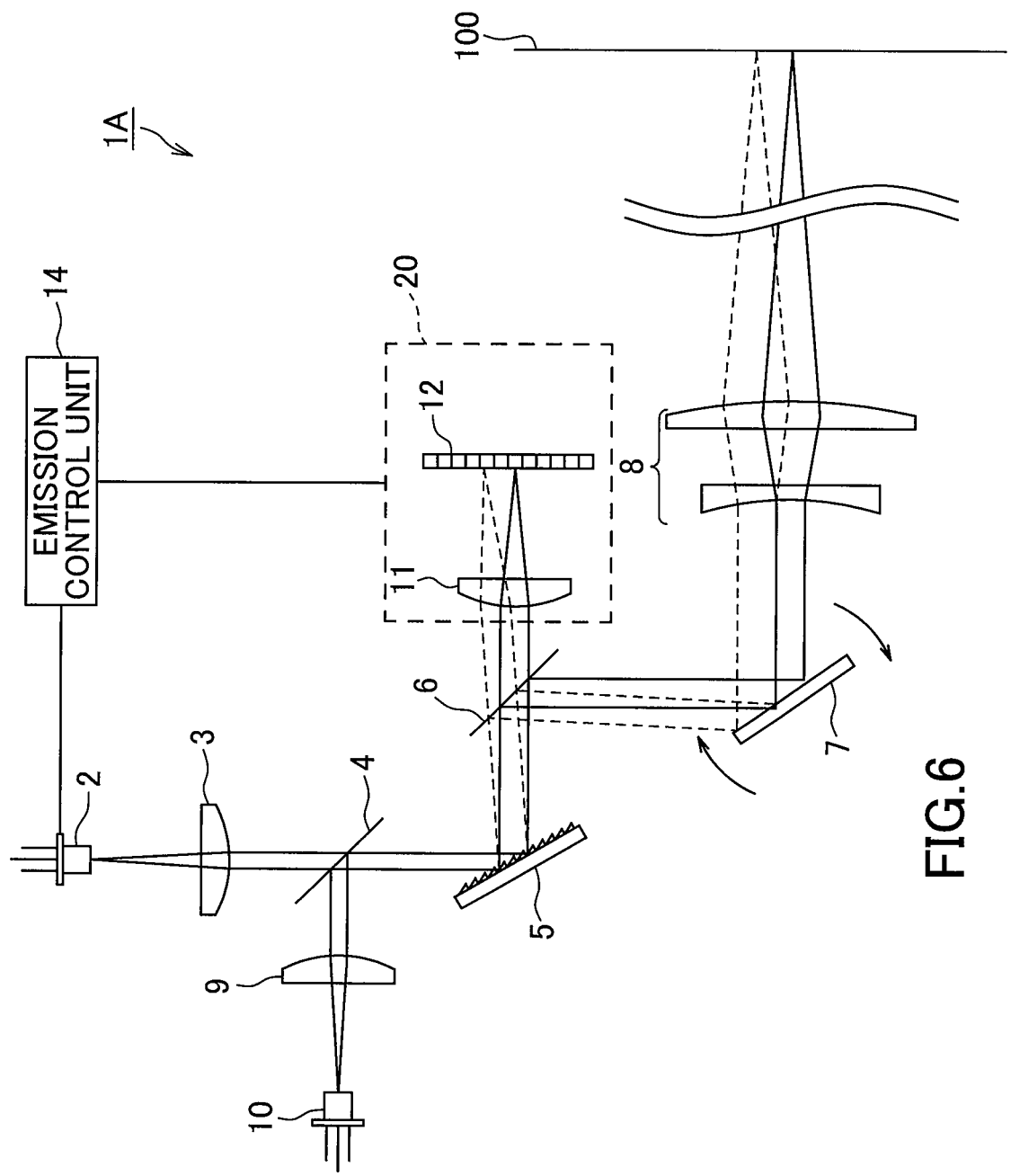
FIG. 6 is a schematic configuration diagram of an optical device according to a second embodiment of the present invention.

As shown in FIG. 6, an optical device 1A according to the present embodiment includes a light source 2, a collimator lens 3, a beam splitter 4, a diffraction grating 5, a beam splitter 6, a MEMS mirror 7, a light projecting and receiving lens 8, a condenser lens 9, a light receiving element 10, a condenser lens 11, a line sensor 12, and an emission control unit 14.

In the present embodiment, the emission control unit 14 is provided in place of the MEMS control unit 13 shown in FIG. 1. The emission control unit 14 as a control means detects a change in the wavelength of the laser light emitted from the light source 2 based on the signal indicating the light receiving intensity of each light receiving element detected by the line sensor 12, and changes the timing of emission of the laser light from the light source 2.

In the present embodiment, in response to a change of the optical path of the laser light when the wavelength of the laser light emitted from the light source 2 varies, and the diffraction angle at the diffraction grating 5 changes, the wavelength variation of the laser light is detected by the change in the light receiving element that receives the laser light in the line sensor 12, and the emission timing of the laser light from the light source 2 is changed.

Figure 7:
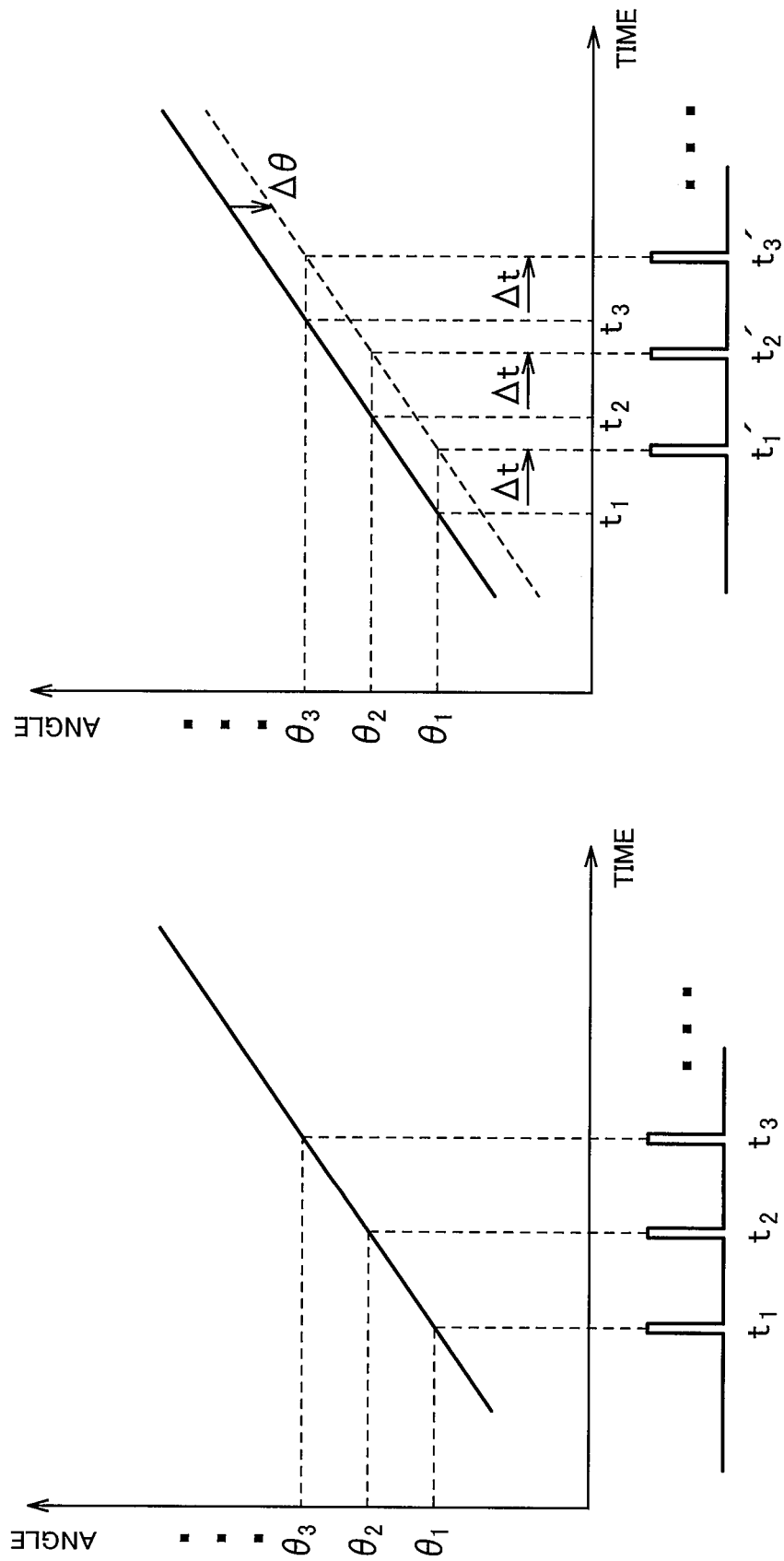
FIG. 7 is a diagram illustrating a relationship between time of a MEMS mirror and a light projection angle.

FIG. 7 is a diagram illustrating the relationship between the time and the angle of the MEMS mirror 7. FIG. 7 shows a case where the angle of the MEMS mirror 7 linearly increases with time. In FIG. 7, it is assumed that the projection angle of the laser beam by the MEMS mirror 7 at time $t_1$ is $\theta_1$, the projection angle of the laser beam by the MEMS mirror 7 at time $t_2$ after time $t_1$ is $\theta_2$, and the projection angle of the laser beam by the MEMS mirror 7 at time $t_3$ after time $t_2$ is $\theta_3$ (see the left diagram in FIG. 7).

Here, assuming that the wavelength of the laser light emitted from the light source 2 varies and the diffraction angle by the diffraction grating 5 changes by $\Delta\theta$, the relationship between time and the light projection angle is as shown by the broken line in the right diagram of FIG. 7, and the range scanned by the laser beam is changed. As shown in the right diagram of FIG. 7, in order to make the scanning range the same as before the wavelength of the laser light varies, the emission timing of the laser light needs to be delayed by $\Delta t$ from the times $t_1$, $t_2$, and $t_3$ to the times $t_1'$, $t_2'$, and $t_3'$ respectively.

The magnitude of $\Delta t$ can be calculated from the rotation (swing) speed of the mirror in the MEMS mirror 7 and the magnitude of $\Delta\theta$. Further, whether the timing of emitting the pulse light is advanced or delayed can be determined by the rotation direction of the MEMS mirror 7 and the sign of $\Delta\theta$. The sign of $\Delta\theta$ indicates whether the wavelength of the light source 2 has varied to the short wavelength side or the long wavelength side with respect to before the change, and specifically, it indicates whether the angle increases or decreases when the diffraction angle of the diffraction grating 5 changes. This sign is, for example, "+" when the diffraction angle increases, and "−" when the diffraction angle decreases.

When detecting that the light receiving element that has received the laser light has changed based on the light receiving intensity output from the line sensor 12, the emission control unit 14 determines that the wavelength of the laser light has changed. Then, the emission control unit 14 calculates the above-described $\Delta\theta$ and the sign from the change in the light receiving element, calculates $\Delta t$ from the calculated $\Delta\theta$, determines the corrected timing, and causes the light source 2 to emit the pulse light at that timing. In this way, it is possible to suppress the variation in the scanning range of the laser light due to a change in the optical path of the laser light.

According to the present embodiment, the emission control unit 14 controls the timing at which the laser light is emitted from the light source 2 so as to suppress the variation in the scanning range of the laser light. In this way, by changing the emission timing of the laser light, it is possible to suppress the variation in the scanning range of the emitted light due to a change in the optical path of the laser light.

Embodiment 3

Next, an optical device according to a third embodiment of the present invention will be described with reference to FIGS. 8 to 10. Note that the same components as those in the above-described first and second embodiments are denoted by the same reference signs, and the descriptions thereof will be omitted.

Figure 8:
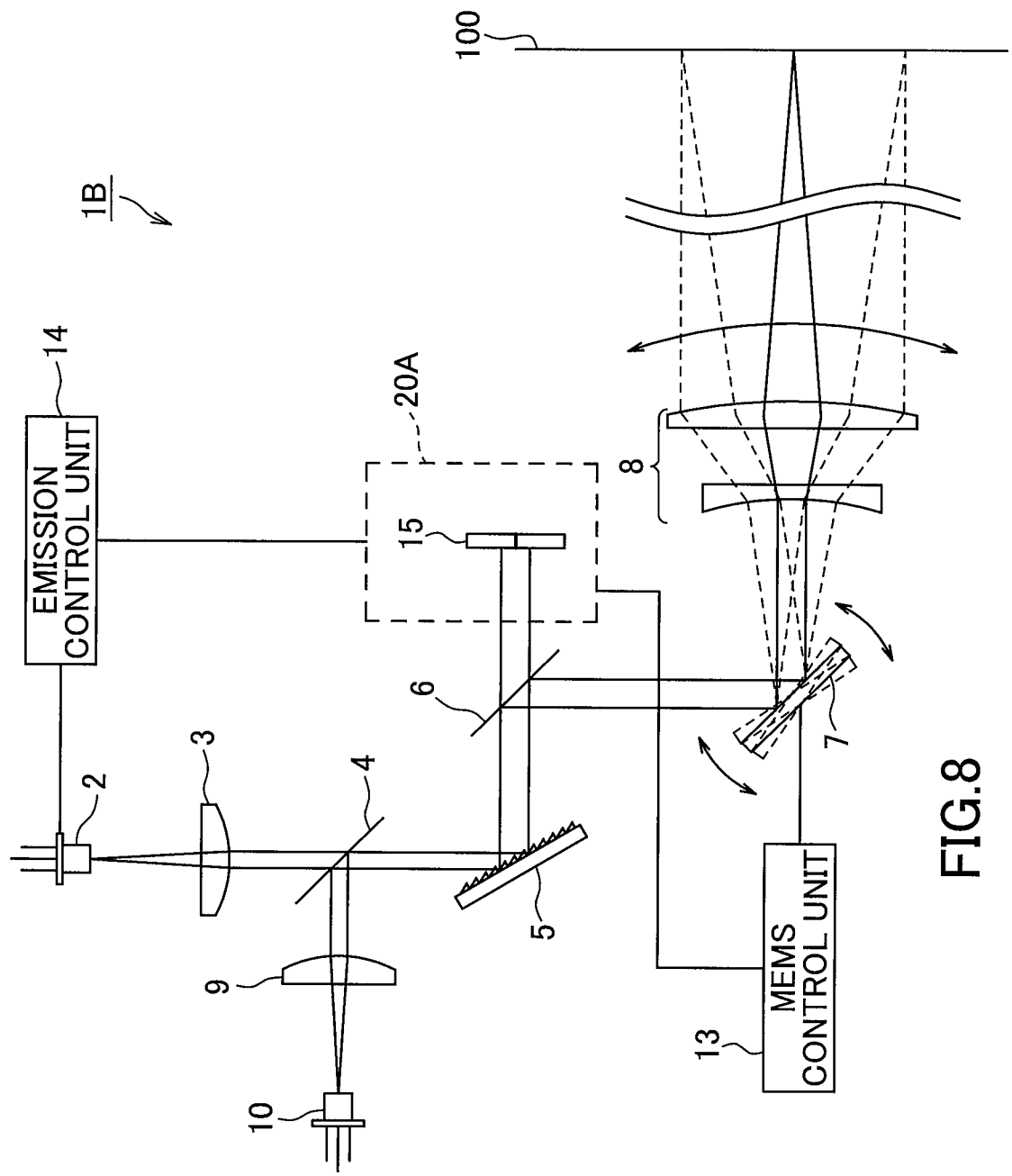
FIG. 8 is a schematic configuration diagram of an optical device according to a third embodiment of the present invention.

As shown in FIG. 8, an optical device 1B according to the present embodiment includes a light source 2, a collimating lens 3, a beam splitter 4, a diffraction grating 5, a beam splitter 6, a MEMS mirror 7, a light projecting and receiving lens 8, a condenser lens 9, a light receiving element 10, a divided PD 15, a MEMS control unit 13, and an emission control unit 14.

In the present embodiment, a wavelength monitor 20A constituted by the divided PD 15 is provided instead of the wavelength monitor 20 constituted by the condenser lens 11 and the line sensor 12.

Figure 9:
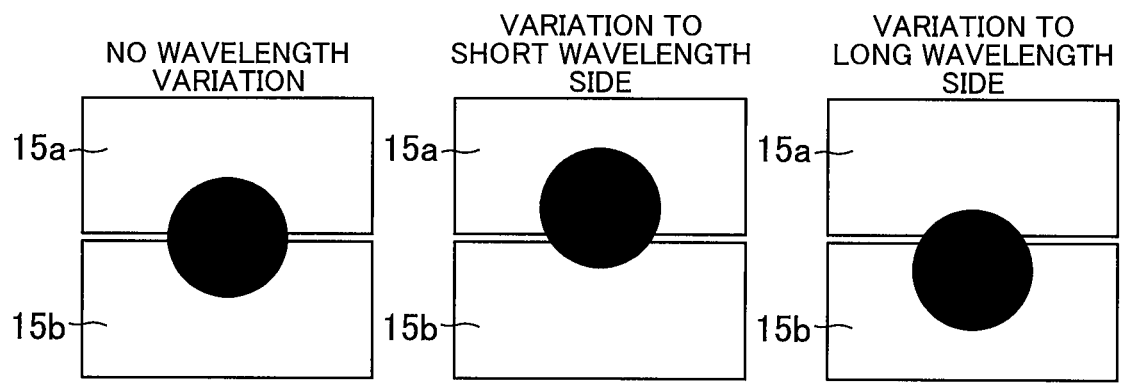
FIG. 9 is an explanatory diagram of a split PD.

FIG. 9 shows a schematic configuration of the divided PD 15. As shown in FIG. 9, the divided PD is a light receiving element divided into two parts, a photodiode (PD) 15a and a PD 15b. The PD 15a and the PD 15b are divided in a direction perpendicular (orthogonal) to the diffraction direction.

In the divided PD 15 shown in FIG. 9, when the wavelength of the light source 2 does not change, the laser light emitted from the light source 2 is equally received by the PD 15a and the PD 15b as shown in the left diagram of FIG. 9. When the wavelength of the light source 2 varies to a shorter wavelength side than before the variation, the laser light emitted from the light source 2 is received with a bias toward the PD 15a as shown in the center diagram of FIG. 9. When the wavelength of the light source 2 varies to a longer wavelength side than before the variation, the laser light emitted from the light source 2 is received with a bias toward the PD 15b as shown in the right diagram of FIG. 9.

Figure 10:
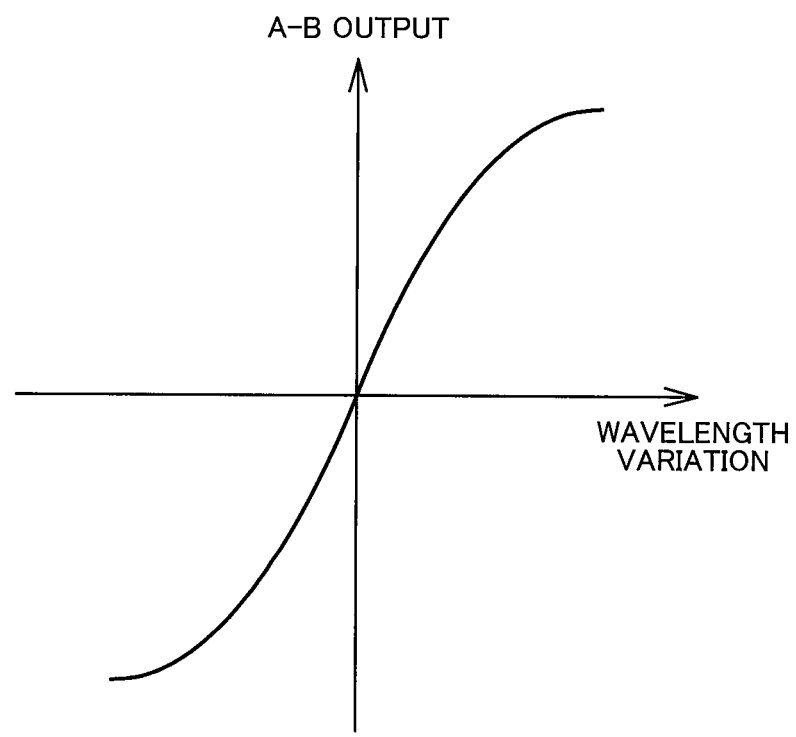
FIG. 10 is a graph showing a relationship between a difference value between two PDs in the split PD and a variation amount of a wavelength of laser light.

The relationship between the difference between the output signal of the PD 15a and the output signal of the PD 15b and the amount of variation in the wavelength of the laser light in the divided PD 15 shown in FIG. 9 is as shown in FIG. 10. In FIG. 10, A-B is a difference value between the output signal of the PD 15a and the output signal of the PD 15b.

When the MEMS control unit 13 and the emission control unit 14 have a graph shown in FIG. 10 as a table, a formula, or the like, the amount of variation in wavelength can be calculated from the difference between the output signals of the two PDs of the divided PD 15. Therefore, it is possible to control the angle of the MEMS mirror 7 or control the emission timing of the light source 2 based on the calculated amount of variation.

Note that in the third embodiment, both the MEMS control unit 13 and the emission control unit 14 are provided. However, as shown in the first embodiment and the second embodiment, only one of them may be provided. Of course, in the first embodiment, both the MEMS control unit 13 and the emission control unit 14 may be provided.

The control by the emission control unit 14 is suitable when the emitted light is pulsed light, but when the emitted light is continuous light rather than intermittently emitted light such as pulsed light, it is necessary to control by the MEMS control unit 13. By providing both the MEMS control unit 13 and the emission control unit 14, in the case of an optical device capable of switching between pulsed light and continuous light for emission, in both the pulsed light and the continuous light, it is possible to suppress the variation in the scanning range of the emitted light due to a change in the optical path of the laser light.

Further, in the above-described embodiment, the MEMS control unit 13 and the emission control unit 14 use the wavelength variation detection units such as the line sensor 12 and the divided PD 15 so that the variation in the scanning range of the emitted light due to the change in the optical path of the laser light is suppressed. However, a temperature sensor may be provided as temperature detecting means for detecting the temperature of the light source 2, and the MEMS control unit 13 or the emission control unit 14 may be controlled based on the detection result of the temperature sensor so as to suppress the variation in the scanning range of the emitted light due to a change in the optical path of the laser light. It is known that the wavelength of the light source 2 varies depending on the temperature. Therefore, when the temperature of the light source 2 varies, the wavelength of the laser light varies, and the scanning range of the emitted light may vary.

In such a case, if the relationship between the temperature and the wavelength of the light source 2 is known in advance, the MEMS control unit 13 or the emission control unit 14 may have the relationship as a table or a formula, and based on the temperature detected by the temperature sensor, control can be performed so as to suppress the variation in the scanning range of the emitted light due to a change in the optical path of the laser light.

Further, this invention is not limited to the above embodiments. That is, those skilled in the art can implement various modifications in accordance with conventionally known knowledge without departing from the scope of the present invention. Of course, such modifications are included in the scope of the present invention as long as the configuration of the optical device of the present invention is provided.

REFERENCE SIGNS LIST

1, 1A, 1B Optical device
2 Light source (emitting unit)
5 Diffraction grating (optical member)
7 MEMS mirror (scanning unit)
10 Light receiving element (light receiving unit)
11 Condenser lens
12 Line sensor (wavelength variation detection unit)
13 MEMS control unit (control unit)
14 Emission control unit (control unit)
15 Split PD (wavelength variation detection unit)
100 Object

The invention claimed is:

1. An optical device comprising:
   a laser diode that emits emitted light;
   a mirror that scans the emitted light toward a predetermined range;
   an optical member that guides the emitted light to the mirror by guiding the emitted light in a direction corresponding to a wavelength; and
   a controller that performs control so as to suppress a variation in a scanning range of the emitted light by the mirror, the variation in the scanning range being due to an optical path change of the emitted light in a transverse direction through the optical member caused by a change in the wavelength of the emitted light, the transverse direction extending transversely to an optical axis of the emitted light.

2. The optical device as claimed in claim 1, wherein the mirror is a swinging mirror, and
   wherein the controller performs control so as to suppress the variation in the scanning range of the emitted tight by changing an angle caused by swinging of the mirror.

3. The optical device as claimed in claim 1, wherein the controller performs control so as to suppress the variation in the scanning range of the emitted light by controlling timing of emitting the emitted light from the laser diode.

4. The optical device as claimed in claim 1, further comprising a photodiode that receives reflected light reflected by an object with the emitted light scanned from the mirror,
   wherein the optical member guides the reflected light to the photodiode.

5. The optical device as claimed in claim 1, further comprising a temperature sensor that detects temperature of the laser diode,
   wherein the controller performs control so as to suppress the variation in the scanning range of the emitted light by the mirror based on the temperature of the laser diode detected by the temperature sensor.

6. The optical device as claimed in claim 1, further comprising a light sensor that detects a variation of the wavelength of the emitted light,
   wherein the controller performs control so as to suppress the variation in the scanning range of the emitted light by the mirror based on the variation of the wavelength of the emitted light detected by the light sensor.

7. A distance measuring device comprising:
   an optical device as claimed in claim 1,
   wherein the distance measuring device measures a distance to an object based on a time required from emission of the emitted light to reception of the emitted light by a light receiving unit.

* * * * *